United States Patent [19]
Korsgaard

[11] 3,832,746
[45] Sept. 3, 1974

[54] FLOAT TOW LINE GUIDE

[76] Inventor: Carl S. Korsgaard, 747 N. Azusa Ave., West Covina, Calif. 91790

[22] Filed: Apr. 5, 1973

[21] Appl. No.: 348,024

[52] U.S. Cl.................. 9/400, 242/85.1, 244/155 A
[51] Int. Cl............................................ B63c 11/00
[58] Field of Search.......... 244/135 R; 242/85.1, 96; 9/8, 400

[56] References Cited
UNITED STATES PATENTS

| | | | |
|---|---|---|---|
| 1,634,436 | 7/1927 | Polson | 242/85.1 |
| 1,655,065 | 1/1928 | Baron | 242/85.1 |
| 2,204,939 | 6/1940 | Lyons | 242/85.1 X |
| 3,174,702 | 3/1965 | French | 242/85.1 |
| 3,615,064 | 10/1971 | Geuert | 244/155 A |
| 3,705,697 | 12/1972 | Chagnon | 242/96 |
| 3,746,286 | 7/1973 | Christoffel | 244/155 A |

FOREIGN PATENTS OR APPLICATIONS

| | | | |
|---|---|---|---|
| 447,636 | 5/1936 | Great Britain | 242/85.1 |

*Primary Examiner*—Duane A. Reger
*Assistant Examiner*—Gregory W. O'Connor

[57] ABSTRACT

To provide means for attaching a line to a float or the like, a float tow line guide is provided which includes a forward portion or reel for storage of a line and a rearward portion or handle for guiding the line to a centrally located line passage means. This allows varying the length of line to be stored by the handle while at the same time providing a centrally located line discharge means to prevent twisting of the handle during use.

4 Claims, 4 Drawing Figures

PATENTED SEP 3 1974  3,832,746

FLOAT TOW LINE GUIDE

BACKGROUND OF THE INVENTION

There are many example of the desirability of having a handle for attachment to a line and which is attached to another object. An example of this is a scuba diver who wishes to remain in contact with a float or the like. A simple example of such a device is the freely spinning common reel which is ordinarily held with one or two hands and from which a line emanates and is attached to a float or the like. Another example is the simple spool upon which the line is wound and which the scuba diver grasps in order to wind or unwind the spool to the float. However, in these examples, the construction is either rather complicated or twisting of the handle results. This invention obviates the above disadvantages. Also, this structure is planar and is an integral one-piece construction.

SUMMARY OF THE INVENTION

The invention may be summarized as a float tow line quide attachment by a line to a float, which guide includes a forward portion or reel having means to store the line and a rearward portion or handle having means to feed a line to a centrally located passageway. The passageway is substantially at the intersection of the reel and handle portions and comprises a slot, the sides facing toward the reel and handle portions. The slot has an opening facing the handle portion to allow passage of the line to the float or the like with means on the reel portion to feed the line including line storage means converging toward the slot. The device lies in a substantially single plane.

DESCRIPTION OF THE PREFERRED EMBODIMENT

Figure 1:
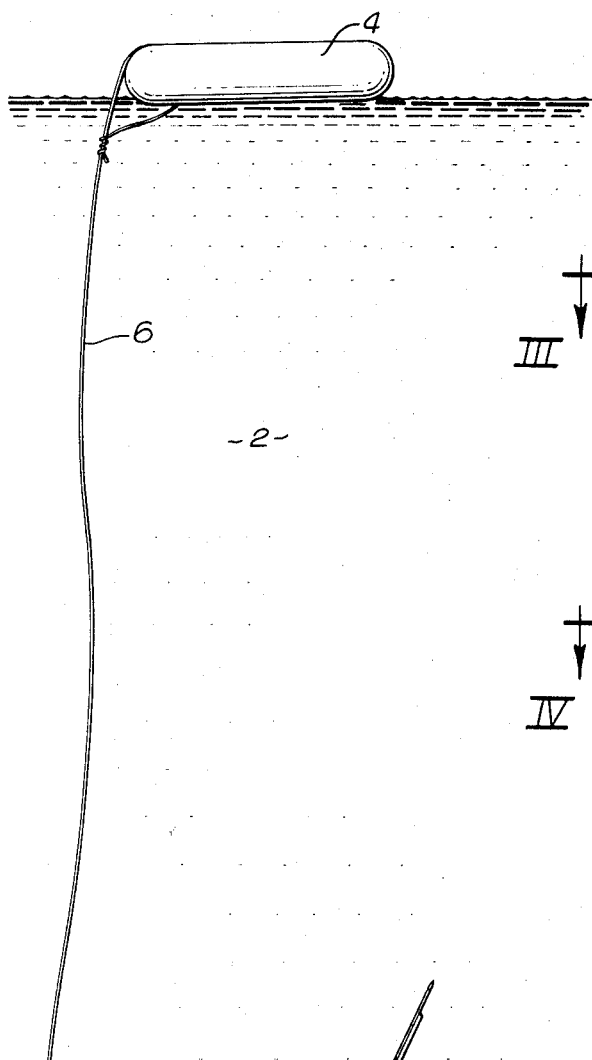
FIG. 1 shows the guide as one example of the use.

Referring to FIG. 1, a body of water shown generally at 2 with a float such as a raft or the like is shown at 4 floating on the surface of the body of water. Attached to float 4 is a line 6 which extends down to guide 8 which forms the subject matter of this invention. A scuba diver 10 or the like is shown holding handle 14 of guide 8 so as to be able to return to or locate float 4 when desired.

Figure 2:
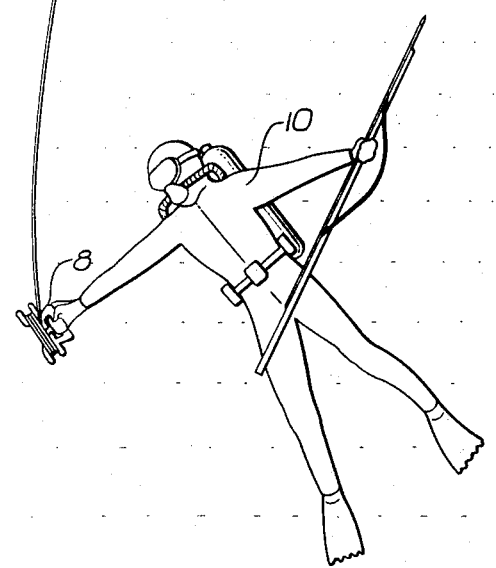
FIG. 2 is a side view of a guide, according to this invention, with a line.
Figure 2:
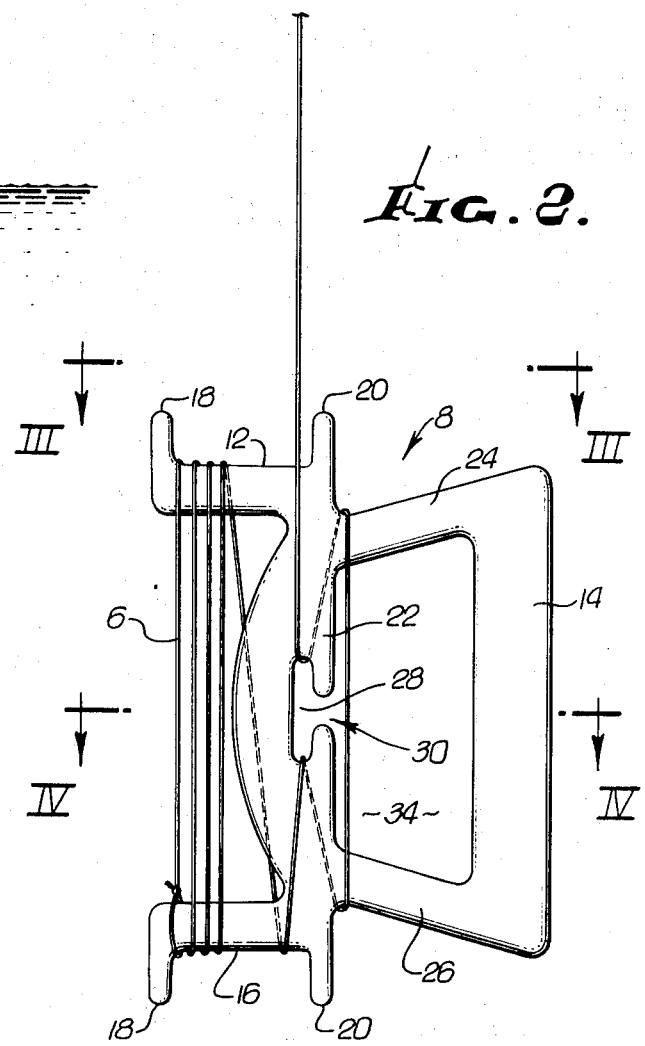
Figure 3:
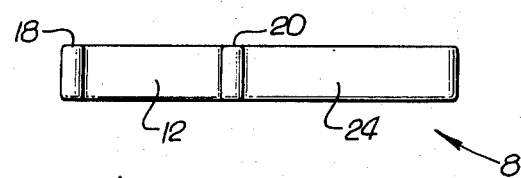
FIG. 3 is a view taken along the lines III—III of FIG. 2.
Figure 4:
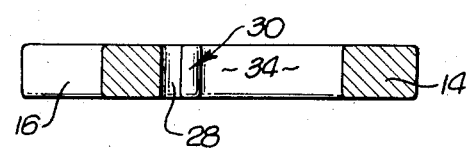
FIG. 4 is a view taken along the lines IV—IV of FIG. 2.

Guide 8 is shown more clearly in FIG. 2. Guide 8 includes a forward portion or reel 12 and a rearward portion or handle 14. Forward portion 12 includes reel members 16 and side walls 18 and 20. This is to hold line 6 in a storage position. Line 6 passes around members 16 so as to be stored for use when needed. Line 6 passes around storage members 16 thence, to converging members 24 and 26 of rearward portion or handle 14, through the central opening 34 thence into slot 28 which has an opening 30 in the integral transverse body 22. By having converging members 24 and 26 of rearward portion or handle 14, line 6 is at all times fed toward the integral transverse body 22 to which the handle portion and the forward portion are connected on opposite sides thereto. The provision of the slot 28 and opening 30 allows line 6 to at all times pass through substantially the center of guide 8 so as to prevent twisting of the handle when grasped by the scuba diver or the like. Note that the guide is of integral construction and that its various parts lie in substantially a single plane.

Adjustment of the length of line 6 is accomplished by releasing line 6 from slot 28 and opening 30 and central opening 34. To feed out line, the line is simply unwound from the reel. To haul in the line, the line is merely slipped around portions 16 and stored on the reel.

As seen in FIG. 2, the middle portion of guide 8 has a curved body or transverse member 22 interconnecting the forward reel portion and the rearward handle portions. This construction provides a strong structural body suitable for forming of the slot 28 therein and for the integral planar construction which allows the guide to function without twisting motion. There are no moving parts and hence the present arrangement for a combination reel, guide and handle results in a reliable simplified construction.

Preferably, the guide is molded of plastic although other materials can be used.

I claim:

1. An integral float tow line guide, reel and handle device comprising:
    a forward reel portion having means for storage of a line,
    a rearward handle portion for grasping said device, and guide means formed therebetween to guide a line passed therethrough,
    wherein said guide means is formed in an integral transverse body formed substantially between said forward and rearward portions, and
    wherein said guide means comprises a centrally located transverse slot opening toward said rearward portion for reception of a line to be guided thereby.

2. The device according to claim 1, wherein said rearward handle portion has central opening means and means to receive said line and to pass said line through the central opening of said rearward handle portion.

3. The device according to claim 2, wherein said means to receive said line includes a converging line receiving means, said converging line receiving means converging toward said slot whereby to hold said line near said integral transverse body.

4. A handle for attachment by a line to a float or the like which comprises:
    a forward portion having means to store a line,
    a rearward portion having means to feed said line to a centrally located passageway, said passageway being substantially at the interesection of said forward and rearward portions and comprising a slot with sides facing said forward and rearward portions, said slot having an opening facing said rearward portion to allow passage of said line to said float or the like, said means on said rearward portion to feed said line including line storage means converging toward said slot.

* * * * *